(12) United States Patent
Nammi et al.

(10) Patent No.: US 10,594,380 B1
(45) Date of Patent: Mar. 17, 2020

(54) CHANNEL STATE INFORMATION DETERMINATION USING DEMODULATION REFERENCE SIGNALS IN ADVANCED NETWORKS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/146,618

(22) Filed: Sep. 28, 2018

(51) Int. Cl.
*H04B 7/02* (2018.01)
*H04B 7/06* (2006.01)
*H04L 5/00* (2006.01)
*H04B 7/0456* (2017.01)

(52) U.S. Cl.
CPC ......... *H04B 7/0626* (2013.01); *H04B 7/0486* (2013.01); *H04B 7/0639* (2013.01); *H04L 5/0048* (2013.01); *H04L 5/0057* (2013.01)

(58) Field of Classification Search
CPC .. H04B 7/0626; H04B 7/0486; H04B 7/0639; H04L 5/0048; H04L 5/0057
USPC ......................................................... 375/267
See application file for complete search history.

(56) References Cited

U.S. PATENT DOCUMENTS

| 9,294,310 | B2 | 3/2016 | Wu et al. |
| 9,363,700 | B2 | 6/2016 | Su et al. |
| 9,374,253 | B2 | 6/2016 | Geirhofer et al. |
| 9,742,480 | B1 | 8/2017 | Nammi et al. |
| 9,793,971 | B2 | 10/2017 | Ko et al. |
| 9,967,012 | B2 | 5/2018 | Onggosanusi et al. |
| 2006/0013177 | A1* | 1/2006 | Saito ........ H04L 45/26 370/338 |
| 2006/0078066 | A1* | 4/2006 | Yun ........ H04B 7/068 375/299 |

(Continued)

FOREIGN PATENT DOCUMENTS

| EP | 3131213 A1 | 2/2017 |
| EP | 2562952 B1 | 5/2018 |
| WO | 2017/137109 A1 | 8/2017 |

OTHER PUBLICATIONS

International Search Report and Written Opinion received for PCT Application Serial No. PCT/US2019/047585 dated Nov. 5, 2019, 13 pages.

*Primary Examiner* — Don N Vo
(74) *Attorney, Agent, or Firm* — Amin, Turocy & Watson, LLP

(57) ABSTRACT

Facilitating channel state information determination using demodulation reference signals in advanced networks (e.g., 4G, 5G, and beyond) is provided herein. Operations of a system can comprise communicating first channel state information to a network device of a communication network. The first channel state information can be determined based on a received reference signal. The operations can also comprise determining second channel state information based on a scheduled demodulation reference signal received from the network device and comprising determining a precoding matrix index, rank information, and channel quality index information. Further, the operations can comprise communicating the second channel state information to the network device.

20 Claims, 10 Drawing Sheets

(56) References Cited

U.S. PATENT DOCUMENTS

| | | | | |
|---|---|---|---|---|
| 2011/0085610 A1* | 4/2011 | Zhuang | ............... | H04L 5/0037 |
| | | | | 375/260 |
| 2014/0341057 A1* | 11/2014 | Seo | ............ | H04W 24/10 |
| | | | | 370/252 |
| 2015/0195020 A1* | 7/2015 | Zhu | ............ | H04B 7/0617 |
| | | | | 370/329 |
| 2015/0215908 A1* | 7/2015 | Seo | ............ | H04L 5/0048 |
| | | | | 370/329 |
| 2018/0013478 A1* | 1/2018 | Chen | ............... | H04L 1/00 |
| 2018/0062724 A1* | 3/2018 | Onggosanusi | ....... | H04B 7/0478 |
| 2018/0091272 A1 | 3/2018 | Wang et al. | | |
| 2018/0219603 A1 | 8/2018 | Park et al. | | |
| 2018/0227029 A1 | 8/2018 | Nammi et al. | | |
| 2018/0279311 A1* | 9/2018 | Yoo | ............ | H04B 17/11 |
| 2019/0140725 A1* | 5/2019 | Aiba | ............ | H04B 7/0626 |

* cited by examiner

CHANNEL STATE INFORMATION DETERMINATION USING DEMODULATION REFERENCE SIGNALS IN ADVANCED NETWORKS

TECHNICAL FIELD

This disclosure relates generally to the field of mobile communication and, more specifically, to channel state information determination and reporting in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
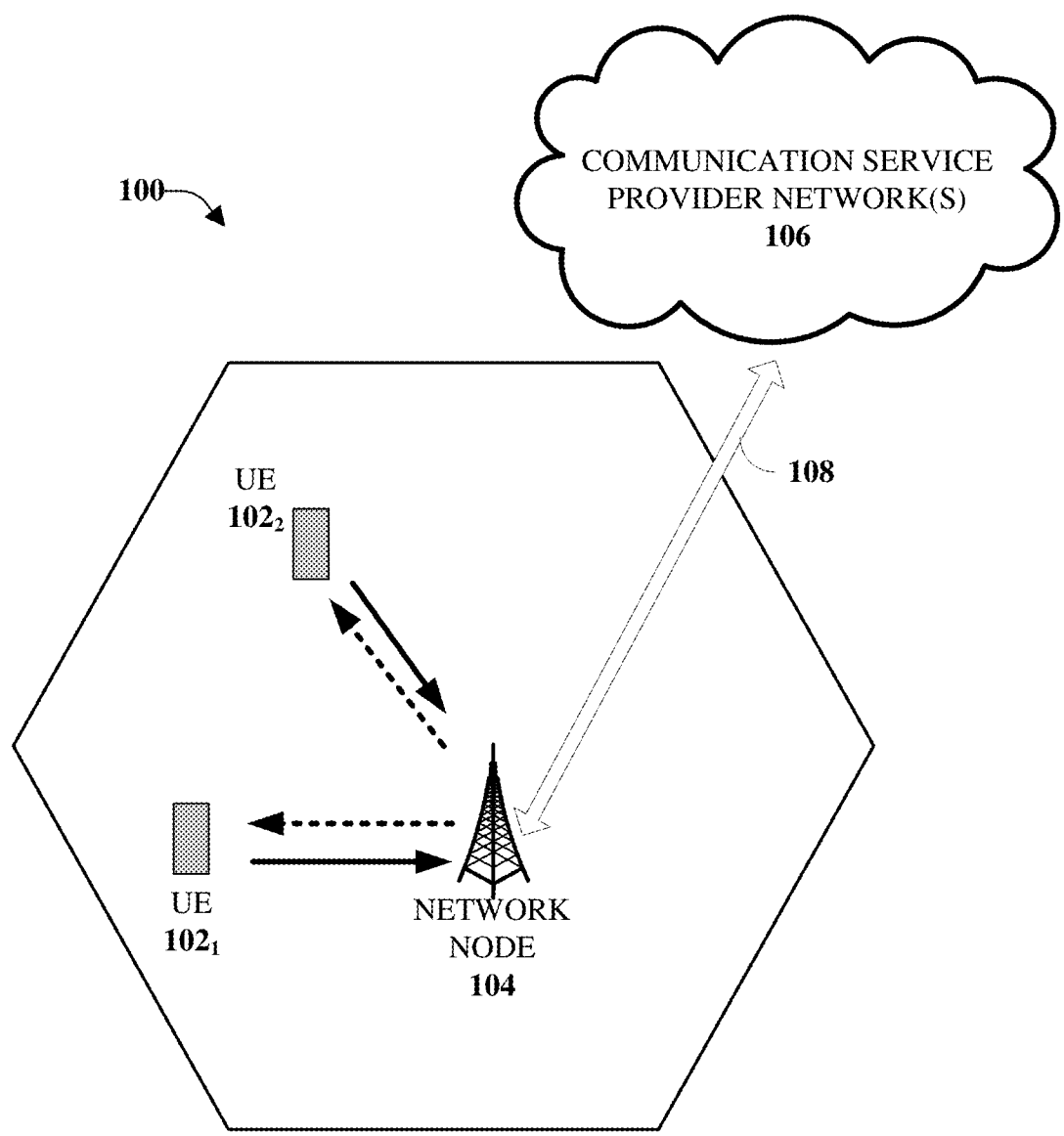
FIG. 1 illustrates an example, non-limiting, wireless communication system in accordance with various aspects and embodiments of the subject disclosure.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate channel state information determination using demodulation reference signals in advanced networks. In one embodiment, described herein is a system that can comprise a processor and a memory that stores executable instructions that, when executed by the processor, facilitate performance of operations. The operations can comprise communicating first channel state information to a network device of a communication network. The first channel state information can be determined based on a received reference signal. The operations can also comprise determining second channel state information based on a scheduled demodulation reference signal received from the network device and comprising determining a precoding matrix index, rank information, and channel quality index information. Further, the operations can comprise communicating the second channel state information to the network device.

In an example, determining the second channel state information can be performed in temporal proximity with (e.g., at about the same time as) decoding a physical downlink shared channel In a further example, decoding the physical downlink shared channel and determining the second channel state information can be performed in a same slot as determining a signal to interference plus noise ratio on an effective channel.

According to some implementations, determining the second channel state information can comprise estimating an effective channel. Further to these implementations, the operations can comprise using the effective channel as a new channel.

In some implementations, the operations can comprise determining a precoding matrix index and rank information. Communicating the second channel state information can comprise communicating the channel quality index information, the precoding matrix index, and the rank information to the network device. Further to these implementations, the operations can comprise determining a first rank of the rank information is less than or equal to a second rank of a physical downlink shared channel transmission.

In another implementation, determining the second channel state information can comprise using mutual information to determine a link quality metric. In other implementations, determining the second channel state information can comprise using capacity information to determine a link quality metric.

According to some implementations, communicating the second channel state information can comprise communicating the second channel state information using a precoded channel. Further to these implementations, the precoded channel can be configured to operate according to a fifth generation wireless network communication protocol.

In another embodiment, provided is a method that can comprise facilitating, by a mobile device of a communication network and to a network device of the communication network, a first transmission of first channel state information determined based on a received reference signal, the mobile device comprising a processor. The method can also comprise determining, by the mobile device, second channel state information based on a demodulation reference signal received from the network device. Further, the method can comprise facilitating, by the mobile device, a second transmission of the second channel state information to the network device. The second channel state information can comprise channel quality index information.

In an example, facilitating the second transmission can comprise facilitating the second transmission to the network device using a precoded channel In another example, determining the second channel state information can comprise determining the second channel state information during a physical downlink shared channel decoding time.

In some implementations, the method can comprise decoding, by the mobile device, a physical downlink shared channel. The method can also comprise determining, by the mobile device, a signal to interference plus noise ratio on an effective channel during a same slot as the decoding the physical downlink shared channel and the determining the second channel state information.

According to some implementations, determining the second channel state information can comprise using mutual information to determine a link quality metric. In accordance with some implementations, determining the second channel state information can comprise using capacity information to determine a link quality metric.

In accordance with another embodiment, provide is a system comprising a processor and a memory that stores executable instructions that, when executed by the processor, facilitate performance of operations. The operations can comprise receiving, from a mobile device, first channel state information for a first reference signal transmitted with a first precoding matrix. The operations can also comprise determining a second precoding matrix based on the first precoding matrix. Further, the operations can comprise transmitting, to the mobile device, a second reference signal with the second precoding matrix.

In an example, determining the second precoding matrix can comprise using a multiplication of previously used precoding matrixes including the first precoding matrix. According to another example, transmitting the second reference signal can comprise transmitting the second reference signal using a channel configured to operate according to a fifth generation wireless network communication protocol.

In another example, the operations can comprise receiving, from the mobile device, second channel state information based on the second reference signal. Further, the operations can comprise determining a third precoding matrix as a function of the first precoding matrix and the second precoding matrix.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Multiple Input, Multiple Output (MIMO) systems can significantly increase the data carrying capacity of wireless systems. For these reasons, MIMO is an integral part of the $3^{rd}$ and $4^{th}$ generation wireless systems. 5G systems can also employ MIMO systems, also called massive MIMO systems (e.g., hundreds of antennas at the Transmitter side and/ Receiver side). In an example of a $(N_t,N_r)$ system, where $N_t$ denotes the number of transmit antennas and $N_r$ denotes the receive antennas, and where N is an integer, the peak data rate multiplies with a factor of $N_t$ over single antenna systems in rich scattering environment.

FIG. 1 illustrates an example, non-limiting, wireless communication system 100 in accordance with various aspects and embodiments of the subject disclosure. In example embodiments, the wireless communication system 100 is or comprises a wireless communication network serviced by one or more wireless communication network providers. In example embodiments, the wireless communication system 100 can comprise one or more user equipment (UEs) 102 (e.g., $102_1$, $102_2$ . . . $102_n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. The UE 102 can also comprise Internet of Thing (IoT) devices that can communicate wirelessly. The UE 102 roughly corresponds to the mobile station (MS) in global system for mobile communications (GSM) systems. Thus, a network node 104 (e.g., network node device) can provide connectivity between the UE and the wider cellular network and can facilitate wireless communication between the UE and the wireless communication network (e.g., the one or more communication service provider networks 106) via the network node 104. The UE 102 can send and/or receive communication data wirelessly to the network node 104. The dashed arrow lines from the network node 104 to the UE 102 represent downlink (DL) communications and the solid arrow lines from the UE 102 to the network node 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In cellular radio access networks (e.g., universal mobile telecommunications system (UMTS) networks), a network node can be referred to as base transceiver stations (BTS), radio base station, radio network nodes, base stations, Node B, eNode B (e.g., evolved Node B), etc.). In 5G terminology, the node can be referred to as a gNode B (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can comprise but are not limited to: Node B devices, base station (BS) devices, access point (AP) devices, and radio access network (RAN) devices. The network node 104 can also comprise multistandard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

The wireless communication system 100 can further comprise one or more communication service provider networks 106 that can facilitate providing wireless communication services to various UEs, comprising UE 102, via the network node 104 and/or various additional network devices (not shown) included in the one or more communication service provider networks 106. The one or more communication service provider networks 106 can comprise various types of disparate networks, comprising: cellular networks, femto networks, picocell networks, microcell networks, internet protocol (IP) networks Wi-Fi service networks, broadband service networks, enterprise networks, cloud based networks, and the like. For example, in at least one implementation, the wireless communication system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation).

In one example, the UE 102 can send a reference signal back to the network node 104. The network node 104 can take a received reference signal from the UE 102, estimate the condition of the channel, which can be influenced by various factors, such as objects in the line of sight, weather, movement, interference, etc., and after correcting for more issues (e.g., interference), can adjust the beamforming rates for each antenna transmitting to the UE 102, and can change parameters, so as to transmit a better beam toward the UE 102. This ability to select MIMO schemes and use beamforming to focus energy and adapt to changing channel conditions can allow for higher data rates.

Figure 2:
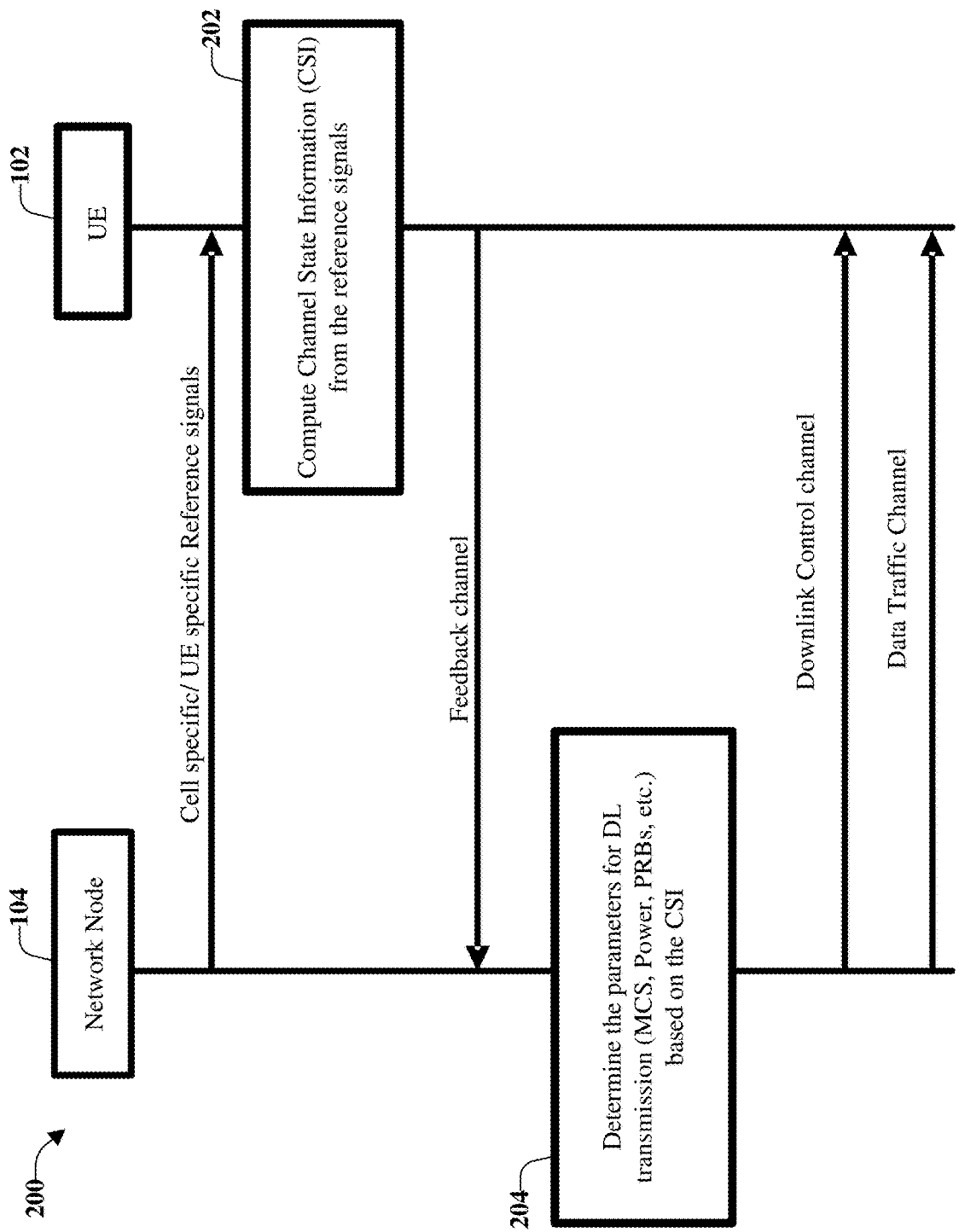
FIG. 2 illustrates an example, non-limiting, schematic system block diagram of a message sequence chart between a network node and user equipment according to one or more embodiments.

FIG. 2 illustrates an example, non-limiting, schematic system block diagram 200 of a message sequence chart between a network node and user equipment according to one or more embodiments. Repetitive description of like elements employed in other embodiments described herein is omitted for sake of brevity. FIG. 2 depicts a message sequence chart for downlink data transfer in 5G systems. The network node 104 can transmit pilot or reference signals to a user equipment (UE) 102. The reference signals can be cell specific and/or user equipment specific in relation to a profile of the UE 102 or some type of mobile identifier. From the reference signals, the UE 102 can compute channel estimates (e.g., channel state information (CSI)) and can compute parameters used for a CSI report at block 202. The CSI report can comprise: a channel quality indicator (CQI), a pre-coding matrix index (PMI), rank information (RI), a CSI-RS Resource Indicator (e.g., CRI the same as beam indicator), and so forth.

The UE 102 can then transmit the CSI report to the network node 104 via a feedback channel either on request from the network node 104, aperiodically, and/or periodically. A network scheduler can leverage the CSI report to determine downlink transmission scheduling parameters at 204, which are particular to the UE 102. The scheduling parameters 204 can comprise modulation and coding schemes (MCS), power, physical resource blocks (PRBs), and so on. The network node 104 can send the scheduling parameters to the UE 102 in the downlink control channel or Physical Downlink Control Channel (PDCCH). FIG. 2 depicts the physical layer signaling where the density change can be reported for the physical layer signaling or as a part of the Radio Resource Control (RRC) signaling. In the physical layer, the density can be adjusted by the network node 104 and then sent over to the UE 102 as a part of the downlink control channel data. The network node 104 can transmit the scheduling parameters, comprising the adjusted densities, to the UE 102 via the downlink control channel Thereafter and/or simultaneously, data can be transferred, via a data traffic channel, from the network node 104 to the UE 102.

MIMO is an advanced antenna technique to improve the spectral efficiency and thereby boosting the overall system capacity. The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). In addition, 3GPP is discussing extending the number of antennas at the base station up to 16/32/64. The configurations represented by (2×1) and (1×2) are special cases of MIMO known as transmit and receive diversity.

Downlink reference signals are predefined signals occupying specific resource elements within a downlink time-frequency grid. There are several types of downlink reference signals that can be transmitted in different ways and used for different purposes by a receiving terminal including, for example, Channel State Information Reference Signals (CSI-RS) and Demodulation Reference Signals (DM-RS or DMRS). CSI-RS can be used by terminals to acquire channel-state information (CSI) and beam specific information (e.g., beam reference signal received power). In 5G, CSI-RS can be UE specific so it can have a significantly lower time/frequency density. DM-RS, also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the above mentioned reference signals, there are other reference signals, namely phase tracking and sounding reference signals that can be used for various purposes.

An uplink control channel carries information about Hybrid Automatic Repeat Request (HARQ-ACK) information corresponding to the downlink data transmission, and channel state information. The channel state information can comprise CRI, RI, CQI, PMI and Layer Indicator, and so on. The CSI can be divided into two categories: a first category for sub band and a second category for wideband. The configuration of subband or wideband CSI reporting is performed through RRC signaling as part of CSI reporting configuration. Table 1 below illustrates the contents of CSI report for PMI format indicator=Wideband, CQI format indicator=wideband and for PMI format indicator=subband, CQI format indicator=subband.

TABLE 1

| Contents of CSI report for both wideband and side band | | | |
|---|---|---|---|
| PMI-FormatIndicator = widebandPMI and CQI-FormatIndicator = widebandCQI | PMI-FormatIndicator = subbandPMI or CQI-FormatIndicator = subbandCQI | | |
| | | | CSI Part II |
| | CSI Part I | wideband | Sideband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |

TABLE 1-continued

| Contents of CSI report for both wideband and side band | | | |
|---|---|---|---|
| PMI-FormatIndicator = widebandPMI and CQI-FormatIndicator = widebandCQI | PMI-FormatIndicator = subbandPMI or CQI-FormatIndicator = subbandCQI | | |
| | | | CSI Part II |
| | CSI Part I | wideband | Sideband |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband is defined according to the bandwidth part of the Orthogonal frequency-division multiplexing (OFDM) in terms of PRBs as illustrated in Table 2 below. The sub band configuration is also performed through RRC signaling.

TABLE 2

| Configurable subband sizes | |
|---|---|
| Carrier bandwidth part (PRBs) | Subband Size (PRBs) |
| <24 | N/A |
| 24-72 | 4, 8 |
| 73-144 | 8, 16 |
| 145-275 | 16, 32 |

According to the 5G NR standard, the UE should report sub band CQI as a differential CQI. This is performed to reduce the uplink overhead. The differential sub band CQI is defined as:

For each sub-band index s, a 2-bit sub-band differential CQI is defined as:

Sub-band Offset level(s)=wideband CQI index−sub-band CQI index(s)

The mapping from the 2-bit wideband differential CQI values to the offset level is shown in Table 3 below.

TABLE 3

| Mapping sub band differential CQI value to offset level | |
|---|---|
| Sub band differential CQI value | Offset level |
| 0 | 0 |
| 1 | 1 |
| 2 | ≥2 |
| 3 | ≤−1 |

In Release 15 NR, the following table summarizes the CSI-RS configuration and the CSI reporting. It can be observed that for CSI reporting, CSI-RS transmission as well as a signaling is needed from the network to the UE.

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]: for reporting on PUSCH, the UE receives triggering on DCI | Triggered by DCI: additionally, activation command [10, TS 38 321] possible as defined in Subclause 5.2.1.5.1. |
| Semi-Persistent CSI-RS | Not supporteed | For reporting on PUCCH, the UE receives an activation command [10, TS 38.321], for reporting on PUSCH, the UE receives triggering on DCI | Triggered by DCI: additionally, activation command [10, TS 38.321] possible as defined in Subclause 5.2.1.5.1. |
| Aperiodic CSI-RS | Not Supported | Not Supported | Triggered by DCI, additionally, activation command [10, TS 38 321] possible as defined in Subclause 5.2.1.5.1. |

A physical downlink control channel (PDCCH) can carry information about scheduling grants. The information can comprise a number of MIMO layers scheduled, transport block sizes, modulation for each codeword, parameters related to HARQ, sub band locations, and so on. It is noted that all DCI formats might not transmit all the information as shown above. In general, the contents of PDCCH depends on transmission mode and DCI format. In some cases, the following information is transmitted by means of the downlink control information (DCI) format: Carrier indicator, Identifier for DCI formats, Bandwidth part indicator, Frequency domain resource assignment, Time domain resource assignment, VRB-to-PRB mapping flag, PRB bundling size indicator, Rate matching indicator, ZP CSI-RS trigger, Modulation and coding scheme for each TB, New data indicator for each TB, Redundancy version for each TB, HARQ process number, Downlink Assignment Index, TPC command for uplink control channel, PUCCH resource indicator, Physical Downlink Shared Channel (PDSCH)-to-HARQ feedback timing indicator, Antenna port(s), Transmission configuration indication, SRS request, CBG transmission information, CBG flushing out information, and/or DMRS sequence initialization.

Figure 3:
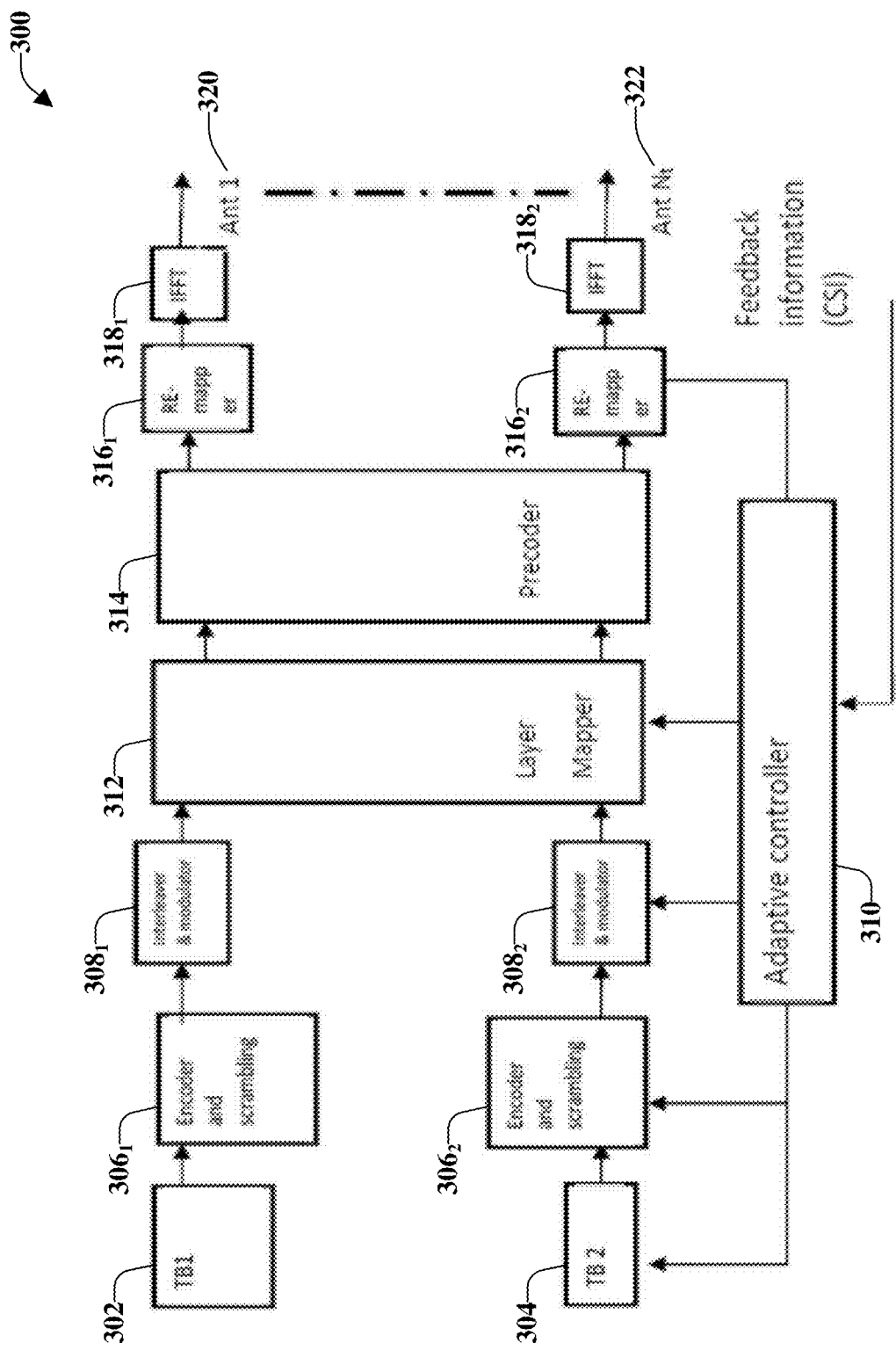
FIG. 3 illustrates an example, non-limiting, representation of a portion of a multiple input, multiple output communication system that comprises a coding chain for a physical downlink shared channel transmitter according to one or more embodiments.

FIG. 3 illustrates an example, non-limiting, representation of a portion of a MIMO communication system 300 that comprises a coding chain for PDSCH transmitter according to one or more embodiments. More specifically, illustrated is a transmission side of a MIMO communication system with $N_t$ transmit antennas. There are up to two transport blocks (TBs), illustrated as a first transport block 302 (TB1) and a second transport block 304 (TB2). The number of transport blocks is equal to one when the number of layers is less than or equal to four. If the number of layers is more than four, then two transport blocks are transmitted.

The CRC bits are added to each transport block (e.g., the first transport block 302 and the second transport block 304) and passed to the channel encoder (e.g., encoder and scrambling $306_1$ and $306_2$). Low density parity check codes (LDPC) is the FEC for NR. The channel encoder (e.g., encoder and scrambling $306_1$ and $306_2$) adds parity bits to protect the data. After encoding, the data stream is scrambled with user specific scrambling. Then the stream is passed through an interleaver (e.g., interleaver and modulator $308_1$ and $308_2$). The interleaver size is adaptively controlled by puncturing to increase the data rate. The adaptation is achieved by using the information from the feedback channel, for example channel state information sent by the receiver. The interleaved data is passed through a symbol mapper (modulator). The symbol mapper is also controlled by the adaptive controller 310. After modulation, the streams are passed through a layer mapper 312 and a precoder 314. The resultant symbols are mapped (e.g., via a re-mapper $316_1$ and $316_2$) to the resources elements in the time-frequency grid of OFDM. The resultant streams are then passed through an IFFT block (e.g., IFFT $318_1$ and $318_2$). It is noted that IFFT block (e.g., IFFT $318_1$ and $318_2$) is necessary for some communication systems which implement OFDMA as the access technology (e.g., 5G, LTE/LTE-A, and so on), in other systems it might be different and is dependent on the multiple access system. The encoded stream is then transmitted through the respective antenna (e.g., a first antenna 320 (Ant 1) through an Nth antenna 322 (Ant $N_t$).

As mentioned above, for CSI reporting, a reference signal for estimating the channel is needed between the UE and the gNB, and report setting which informs the resources used for reporting CSI. It can be observed that the existing configuration involves a large amount of overhead and wastage of resources. This in turn reduces the resources allocated for data traffic channel and the current solution is not attractive for eMBB data applications. In addition, some frameworks for CSI computation involves latency as the UE needs to check the CSI-RS (which can be periodic (e.g., every 5 msec)), and compute the CSI and report the CSI which is periodic (e.g., every 10 msec). Hence, huge delay is involved in using the CSI reported by the UE. This huge delay impacts the delay sensitive applications such as URLLC and mission critical applications. Some methods for DMRS based channel estimation has a limitation as with DMRS based CSI estimation, the UE can compute only CQI as it sees the effective channel of HW. However, with this technique, the UE cannot capture the instantaneous variations of the channel. Therefore, the UE cannot update the PMI and the RI. This deficiency of capturing the instantaneous variations limit the performance of 5G NR. To address this as well as other issues, the disclosed aspects provide an efficient solution to report the CSI for future generation wireless communication systems.

The various aspects provided herein relate to determination of the CSI using the scheduled PDSCH and DM-RS, thereby reducing the overhead for CSI computation. The various aspects comprise multiple embodiments which can be implemented both at the network node and at the UE. For example, provided is a method at the UE to compute the CSI using DMRS and PDSCH based channel estimation. In another example, provided is a method at the UE to report the CSI. In another example, provided is a method at the network to indicate the DMRS based CSI request. In yet another example, provided is a method at the network node to apply the precoding matrix.

Various advantages can be provided with the disclosed aspects. For example, significant gains in sector throughput and cell edge user throughput as the network obtains the information about the CQI efficiently can be achieved with the disclosed aspects. Further, reduction in the signaling overhead can also be achieved with the disclosed aspects.

It is noted that the various aspects are discussed herein with respect to downlink data transmission for MIMO systems. However, the principles are applicable for uplink data transmission and/or side link systems.

For simplicity, the radio network node or simply network node is used for gNB. The term radio network node refers to any type of network node that serves UE and/or is connected to other network node or network element or any radio node from where UE receives signal. Examples of radio network nodes include, but are not limited to, Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), and so on.

Similarly, for reception the term user equipment (UE) is used. UE refers to any type of wireless device that communicates with a radio network node in a cellular or mobile communication system. Examples of a UE include, but are not limited to, target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, and so forth. Further, the terms element, elements, and antenna ports are used interchangeably but carry the same meaning in this detailed description.

Figure 4:
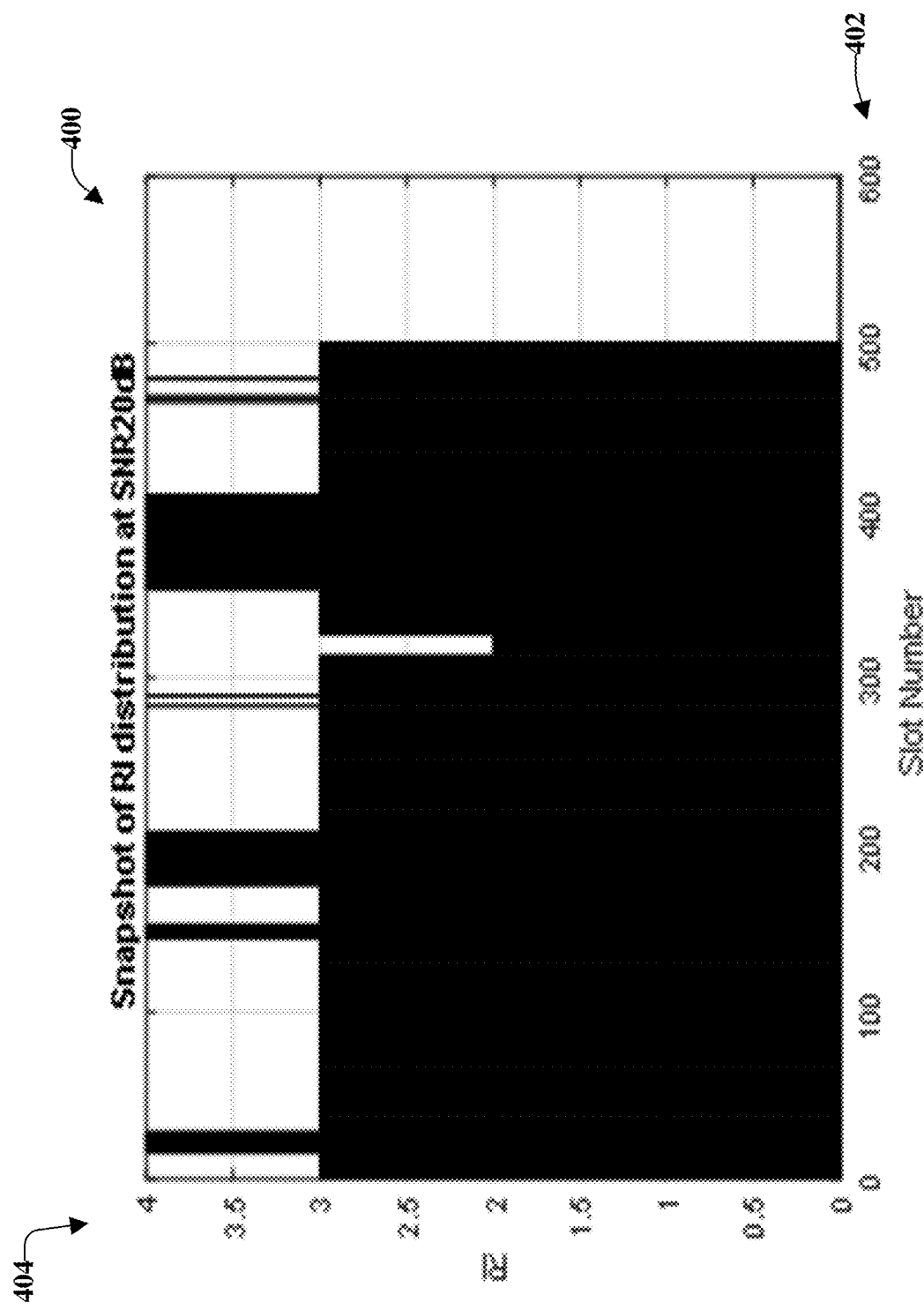
FIG. 4 illustrates a chart of rank information distribution in accordance with one or more embodiments described herein.
Figure 5:
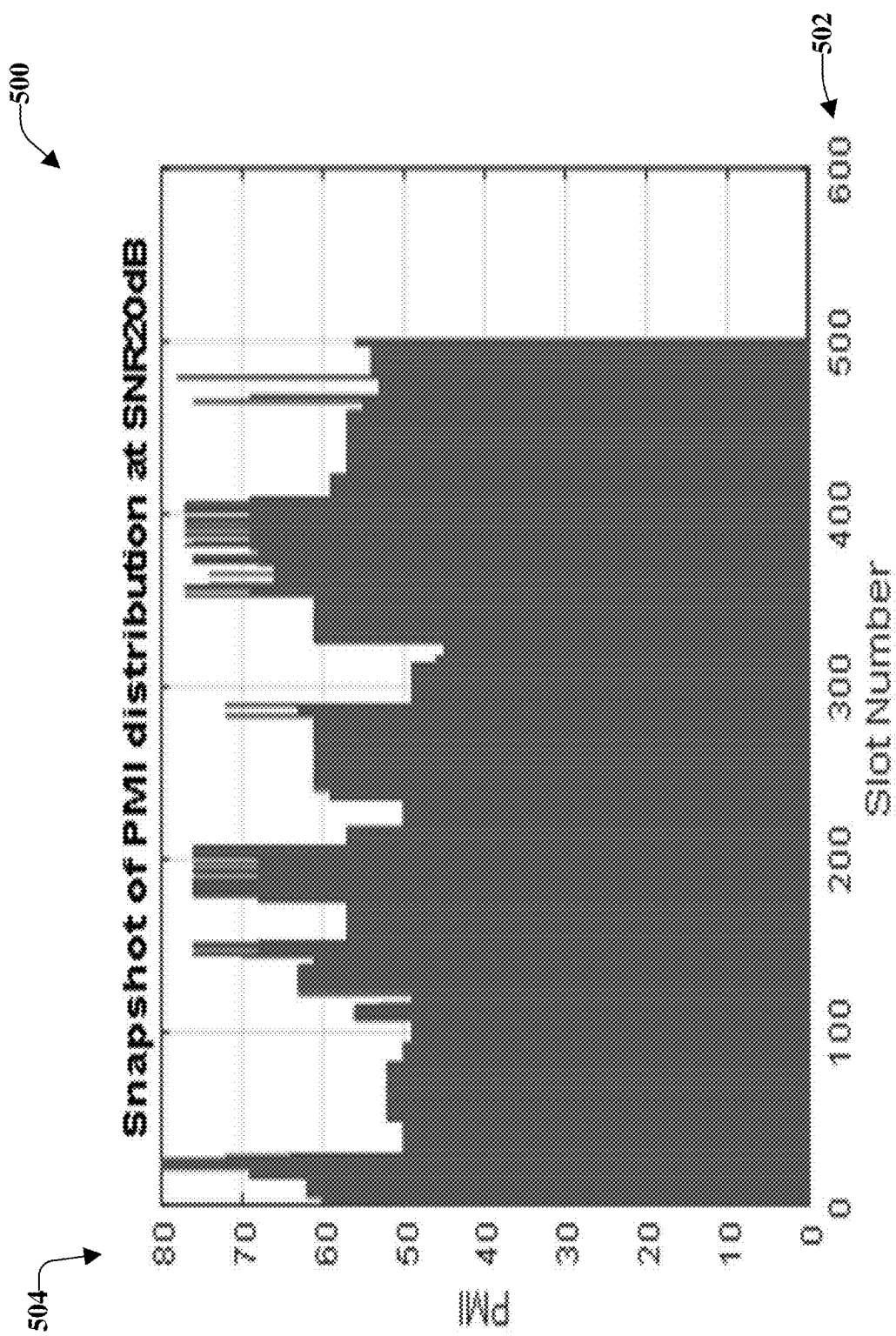
FIG. 5 illustrates a chart of precoding matrix index distribution in accordance with one or more embodiments described herein.

A motivation for the aspects discussed herein is that, in general, RI computed over the entire bandwidth does not change. In a similar manner, the PMI computed over the entire bandwidth does not change as illustrated in FIG. 4 and FIG. 5. More specifically, FIG. 4 illustrates a chart 400 of rank information distribution in accordance with one or more embodiments described herein. Slot number 402 is represented on the horizontal axis and rank information 404 is illustrated on the vertical axis. The rank information distribution illustrated is over 0.5 milliseconds (ms). Further, the chart 400 illustrates a snapshot of the rank information distribution at a Signal-to-Noise Ratio (SNR) of 20 decibels (dB).

FIG. 5 illustrates a chart 500 of precoding matrix index distribution in accordance with one or more embodiments described herein. Slot number 502 is represented on the horizontal axis and precoding matrix index 504 is illustrated on the vertical axis. The precoding matrix index distribution illustrated is over 0.5 milliseconds (ms). Further, the chart 500 illustrates a snapshot of the precoding matrix index at SNR of 20 dB.

Therefore, if the UE can compute the CSI using DMRS based channel estimation for the scheduled rank and scheduled PMI, the CQI computed can be similar to that of CSI-RS based channel estimation. Therefore, the UE can use channel estimation from DM-RS or PDSCH based channel estimation for computing the CQI. Further, the UE can estimate CSI during the PDSCH decoding time. Accordingly, the UE can decode PDSCH as well as compute the CQI in the same slot that the UE finds the Signal to Interference plus Noise Ratio (SINR) on the effective channel HW. According to various implementations, the UE can compute the PMI and RI in addition to CQI.

Mathematically, the received signal Y is written as Y for a MIMO system with $N_t$ transmit antennas and $N_r$ receive antennas, the received signals for the $i^{th}$ subcarrier can be written as:

$$Y=HWx+n$$

where H is the channel matrix between the transmitter antenna elements dimensions ($N_r \times Nt$), W is the digital precoding matrix of dimensions ($N_t \times R$) and x is the transmitted signal vector of size ($R \times 1$), and R is the transmission rank of the system (of the PDSCH).

Upon or after the UE estimates the effective channel HW, the UE can treat the effective channel as a new channel $N_{ew}$. The algorithm to compute the precoding matrix, updated rank, and the CQI will be explained below.

Figure 6:
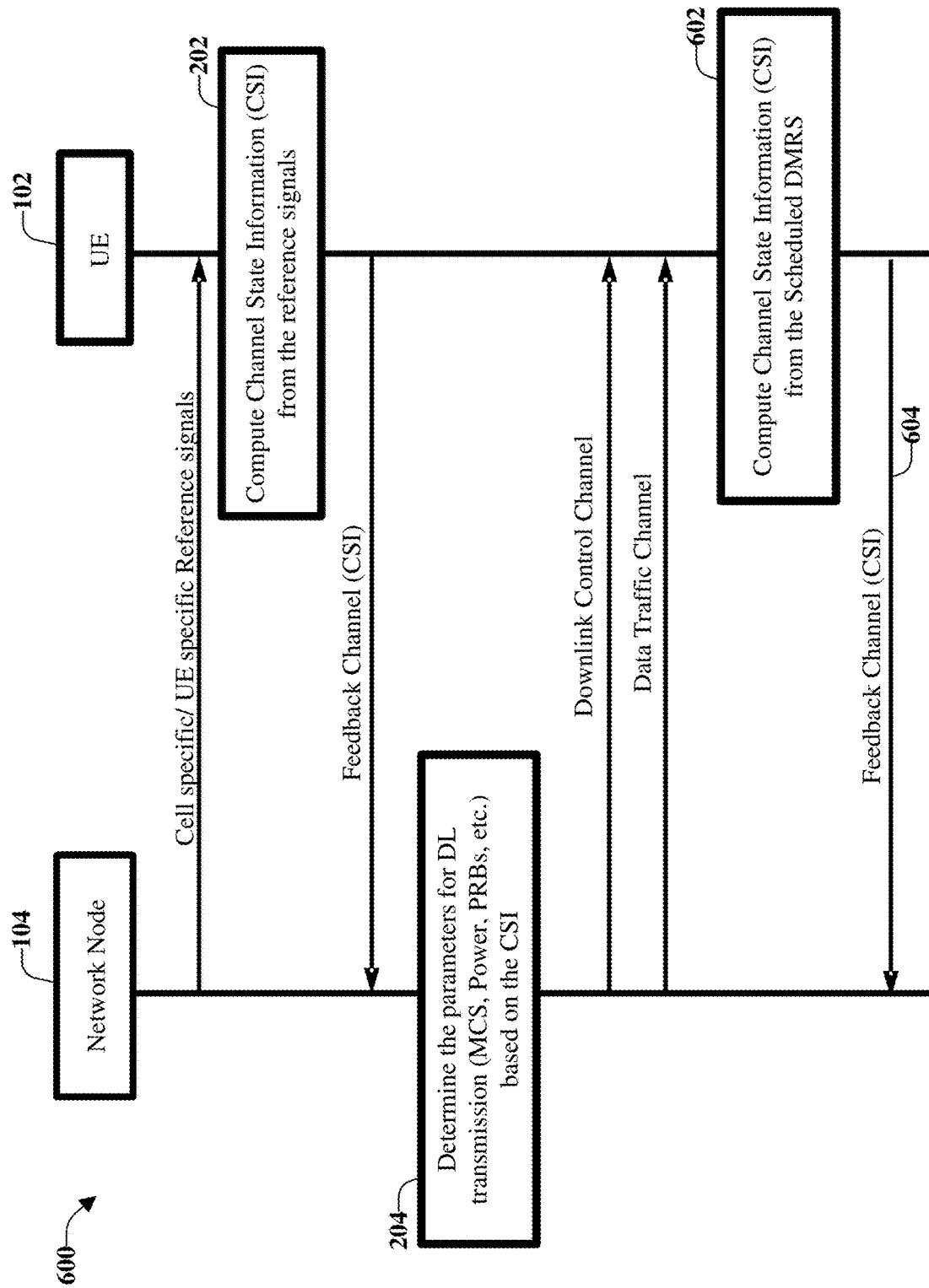
FIG. 6 illustrates an example, non-limiting, schematic system block diagram of a message sequence chart between a network node and user equipment using demodulation reference signals according to one or more embodiments.

FIG. 6 illustrates an example, non-limiting, schematic system block diagram 600 of a message sequence chart between the network node and the user equipment using demodulation reference signals according to one or more embodiments. Repetitive description of like elements employed in other embodiments described herein is omitted for sake of brevity.

As a first embodiment, the UE can estimate the channel using DMRS (at 602) for both PDSCH demodulation as well as for CSI computation for the scheduled number of layers and the precoding. Upon or after the UE estimates the channel, the UE can compute the SINR using the following expression (for MMSE based detector):

$$SINR_i = H_i S^{-1} H_i,$$

$$S = N_0 R_N + HH^H - H_i^* H_i^H$$

According to various implementations, the CSI can be obtained based on using mutual information or based on using a capacity approach. The method for using mutual information will be discussed.

As mentioned above, in NR, the UE should estimate a suitable CSI (e.g., CQI, PMI, and RI), in order to maximize the throughput and simultaneously maintain the block-error-rate (BLER) constraint which, can be mathematically described by a joint (integer) optimization problem, $$\max_{CQI,PMI,RI} \text{Throughput}(CQI, PMI, RI) \quad \text{Equation 1}$$

$$\text{subject to } BLER \leq \text{Threshold}$$

Unfortunately, this joint (discrete/integer) optimization problem does not have any closed-form solution. Therefore, it might be decided to estimate a suitable PMI/RI (independent of CQI). Thereafter, a suitable CQI is estimated accordingly for the chosen PMI (and RI). Where $[A]_{i,i}$ corresponds to an $i^{th}$ diagonal element of a matrix A.

In order to estimate a suitable PMI/RI, so-called a link-quality metric (LQM), for example, mean mutual information, denoted as mMI (per sub-band/wide-band) is computed, as given below, $$mMI = \frac{1}{\text{rank}} \sum_{i=1}^{RI=R} \sum_{k}^{K(i)} \log2(1 + SINRi[k]).$$  Equation 2 where, $I(SINR_i[k])$ is a mutual information that is a function of post-processing $SINR_i[k]$ (and modulation alphabet A) as given in Table 4 below for $i^{th}$ spatial layer and $k^{th}$ resource-element. The number of resource-elements employed for the computation of the aforementioned LQM is given by a parameter K (depending on the wide-band/sub-band PMI estimate).

TABLE 4

| Modulation Alphabet $\mathcal{A}$ | Mutual Information per symbol |
|---|---|
| 4-QAM | $\mathcal{I}(SINR_i) = J(\sqrt{4SINR_i})$ |
| 16-QAM | $\mathcal{I}(SINR_i) \approx (1/2)J(0.8818\sqrt{SINR_i}) +$ $(1/4)J(1.6764\sqrt{SINR_i}) +$ $(1/4)J(0.9316\sqrt{SINR_i})$ |
| 64-QAM | $\mathcal{I}(SINR_i) \approx (1/3)J(1.1233\sqrt{SINR_i}) +$ $(1/3)J(0.4381\sqrt{SINR_i}) +$ $(1/3)J(0.4765\sqrt{SINR_i})$ |

$$J(a) \approx \begin{cases} -0.04210610\,a^3 + 0.209252\,a^2 - 0.00640081\,a, & 0 < a < 1.6363 \\ 1 - \exp(0.00181491\,a^3 - 0.142675\,a^2 - \\ \quad 0.08220540\,a + 0.0549608), & 1.6363 < a < \infty \end{cases}$$

Upon or after having the estimate of mMI (per sub-band/wide-band), the PMI and RI can be jointly estimated employing unconstrained optimization which can be given as, $$\max_{PMI,RI} mMI(PMI, RI)$$

Figure 7:
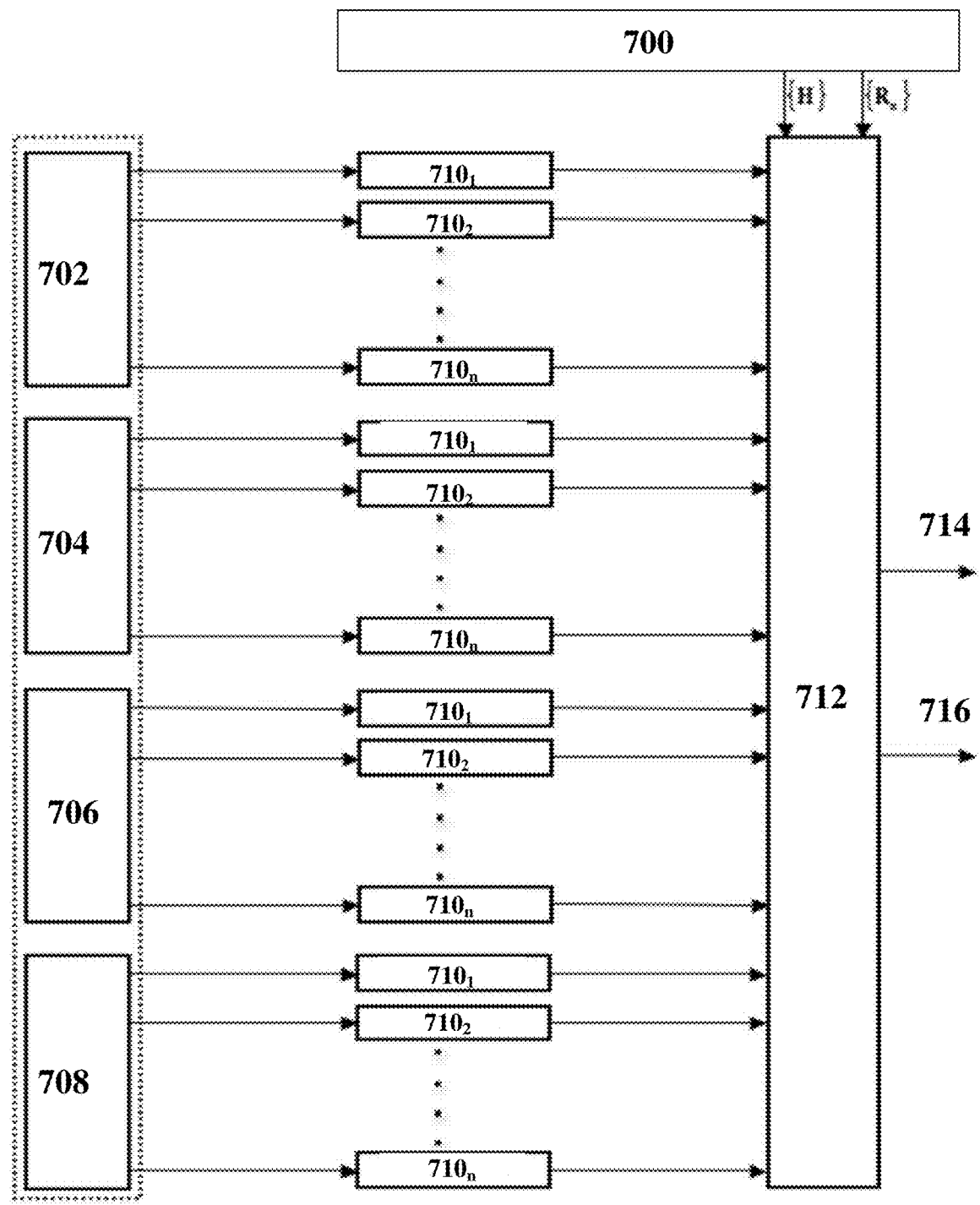
FIG. 7 illustrates an example schematic system block diagram of an exhaustive pre-coding matrix index and rank information search for 4×4 multiple input, multiple output in LTE/LTE-A systems according to one or more embodiments.

FIG. 7 illustrates an example schematic system block diagram of an exhaustive PMI and RI search for 4×4 MIMO in LTE/LTE-A systems according to one or more embodiments. FIG. 7 depicts how the PMI and RI are computed based on the mutual information approach. It is noted that with the chosen PMI/RI, the CQI can be computed afterwards. For example, rank hypothesis (e.g., Rank-1 Hypothesis 702, Rank-2 Hypothesis 704, Rank-3 Hypothesis 706, and Rank-R Hypothesis 708, where R is an integer) can be sent to several corresponding PMI hypothesis $710_1$, $710_2 \ldots 710_n$. Thereafter, data from the corresponding PMI hypothesis $710_1, 710_2 \ldots 710_n$ can be sent and received by block 712. Block 712 can also receive channel estimates, noise covariance estimates and other channel parameters from block 700, whereby block 712 can generate joint PMI and RI estimations. Thereafter, a PMI estimate (e.g., a wideband PMI estimate 714) and an RI estimate 716 can be output by block 712.

The method for using the capacity approach for obtaining the CSI will now be discussed. The method for the capacity approach is similar to the method for using the mutual information. However, for the capacity approach, instead of finding mutual information, the capacity is calculated as shown below:

$$\text{capacity} = \frac{1}{\text{rank}} \sum_{i=1}^{RI=R} \sum_{k}^{K(i)} \log2(1 + SINRi[k])$$

Figure 8:
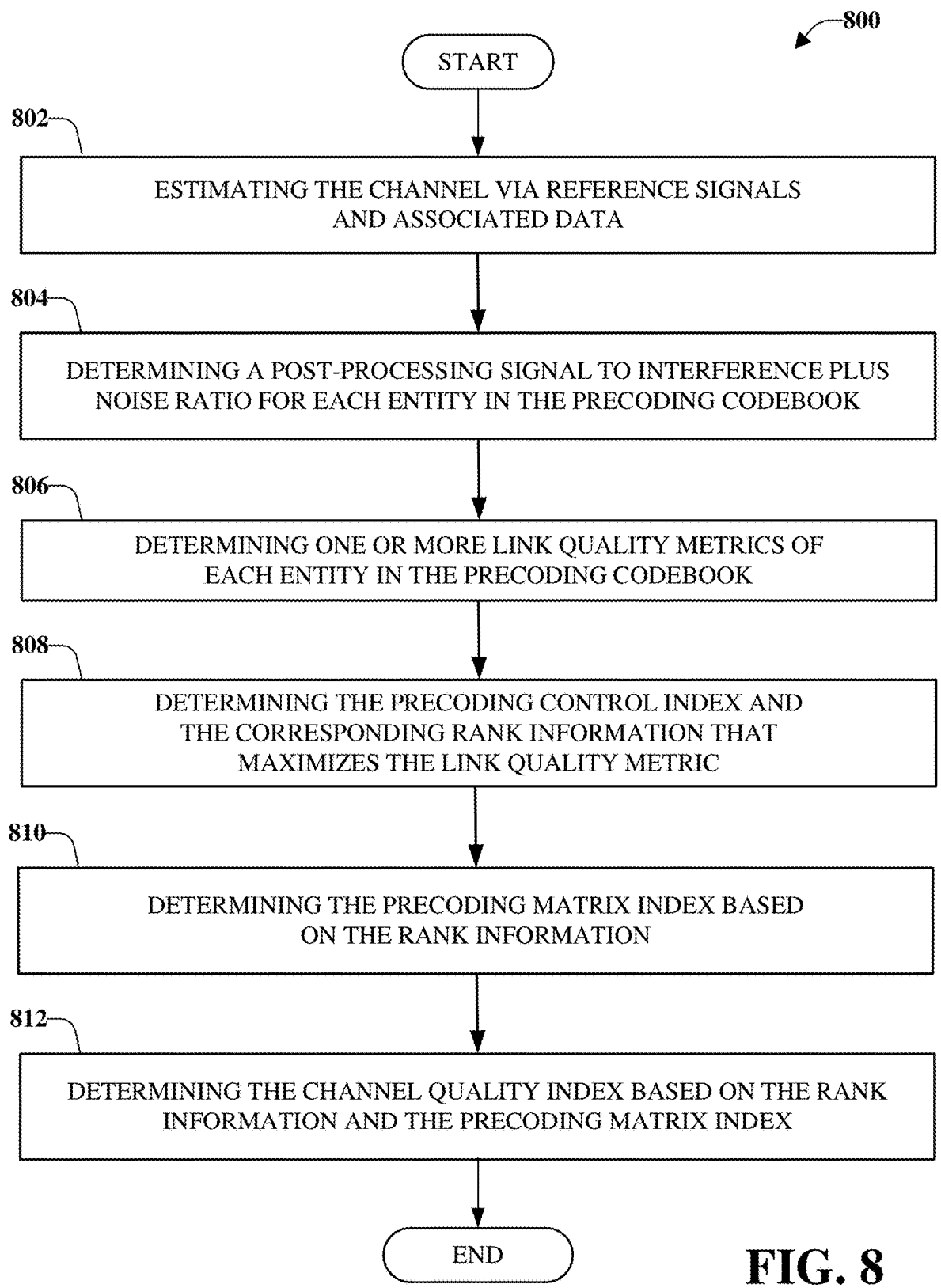
FIG. 8 illustrates an example, non-limiting, method for determining channel quality information in accordance with one or more embodiments described herein.

FIG. 8 illustrates an example, non-limiting, method 800 for determining channel quality information in accordance with one or more embodiments described herein. The method 800 can be utilized for determining link quality metrics for both the mutual information approach and the capacity based approach.

The method 800 can be implemented by a UE of a wireless network, the UE comprising a processor. Alternatively, or additionally, a machine-readable storage medium can comprise executable instructions that, when executed by a processor, facilitate performance of operations for the method 800.

The method 800 starts, at 802, with estimating the channel via reference signals and associated data. For example, the reference signals and associated data can be cell specific/UE specific reference signals that can be received from a base station (e.g., gNB). At 804 of the method 800, a post-processing SINR can be determined. For example, the post-processing SINR can be determined for each entity in a precoding codebook.

Further, at 806 of the method 800, one or more link quality metrics of each entity in the precoding codebook can be determined. The link quality metrics can be either capacity or mutual-information as discussed herein. The precoding control index and the corresponding rank information that maximizes the link quality metric can be determined at 808 of the method 800.

The PMI can be determined, at 810 of the method 800, based on the rank information chosen at 808. Further, at 812, the CQI can be determined based on the rank information and the PMI, determined at 808 and 810, respectively.

According to some implementations, a network device of a wireless network can transmit data with DMRS based on the CSI estimation. The network device can comprise a processor. Alternatively, or additionally, a machine-readable storage medium can comprise executable instructions that, when executed by a processor, facilitate transmission of the data with DMRS based on the CSI estimation.

Upon or after the UE transmits the CSI to the network (e.g., the network device), the network can choose the precoding matrix as the multiplication of previously used precoding matrix W, and the updated precoding matrix (e.g., $W_{updated}$). That is, the system equation now becomes $$Y = HWW_{updated}x + n$$

This procedure can be repeated whenever the network wants to use CSI from DMRS based CSI reporting. It is noted that W is the precoding used for PDSCH. Similarly, the updated rank is always than or equal to R (e.g., the rank of the PDSCH transmission).

As discussed herein, according to an aspect, provides is fast CSI computation and reporting in 5G wireless communication system. Further, according to another aspect, provided is a method at the network node to apply the precoding with DMRS based channel state information estimation. With the disclosed aspects, advantages can include significant gains in sector throughput and cell edge user throughput as the network obtains the information about the CQI/PMI/RI efficiently. Another advantage can include reduction in the signaling overhead.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Described herein are systems, methods, articles of manufacture, and other embodiments or implementations that can facilitate channel state information determination using demodulation reference signals in advanced networks. Facilitating channel state information determination using demodulation reference signals in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
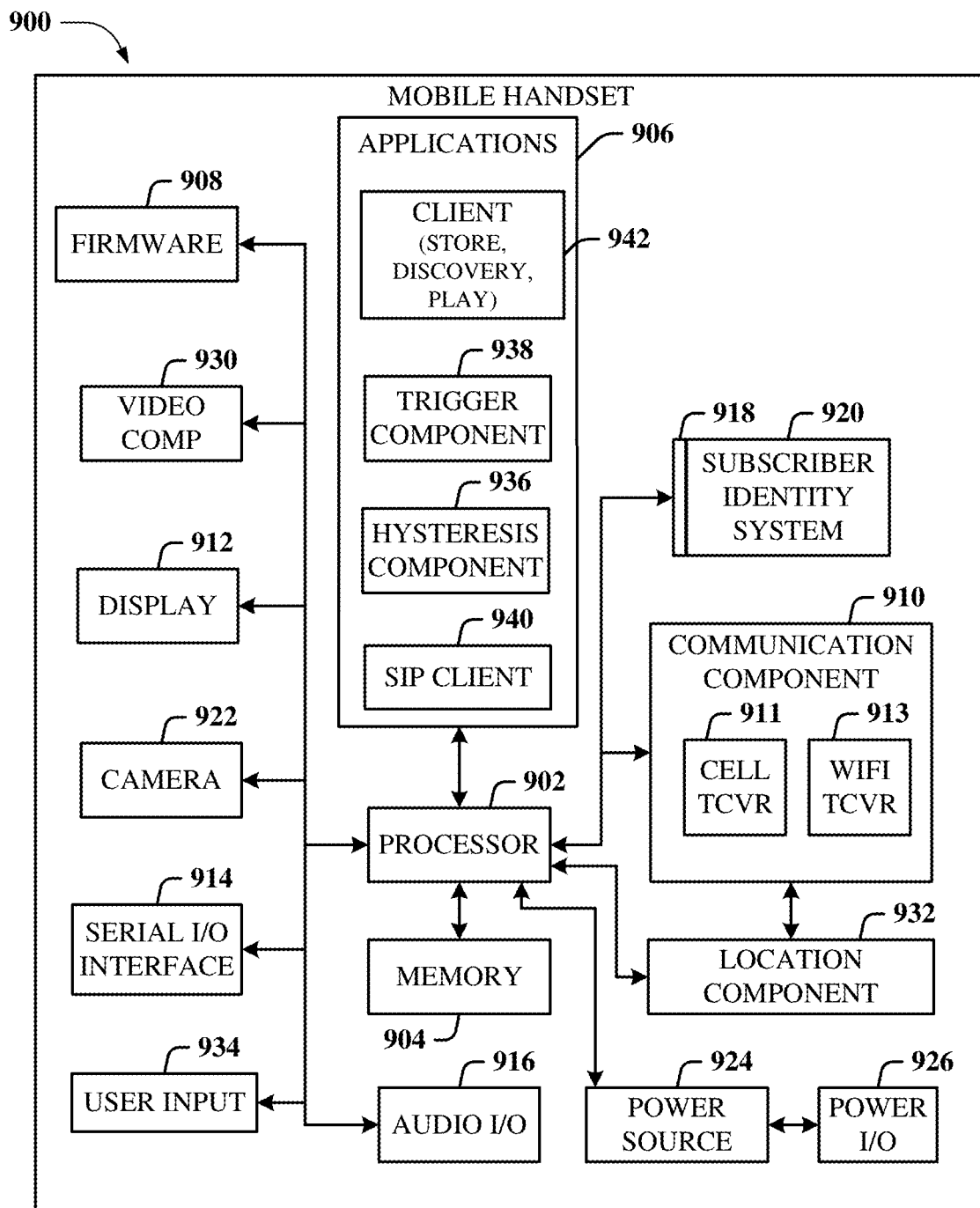
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
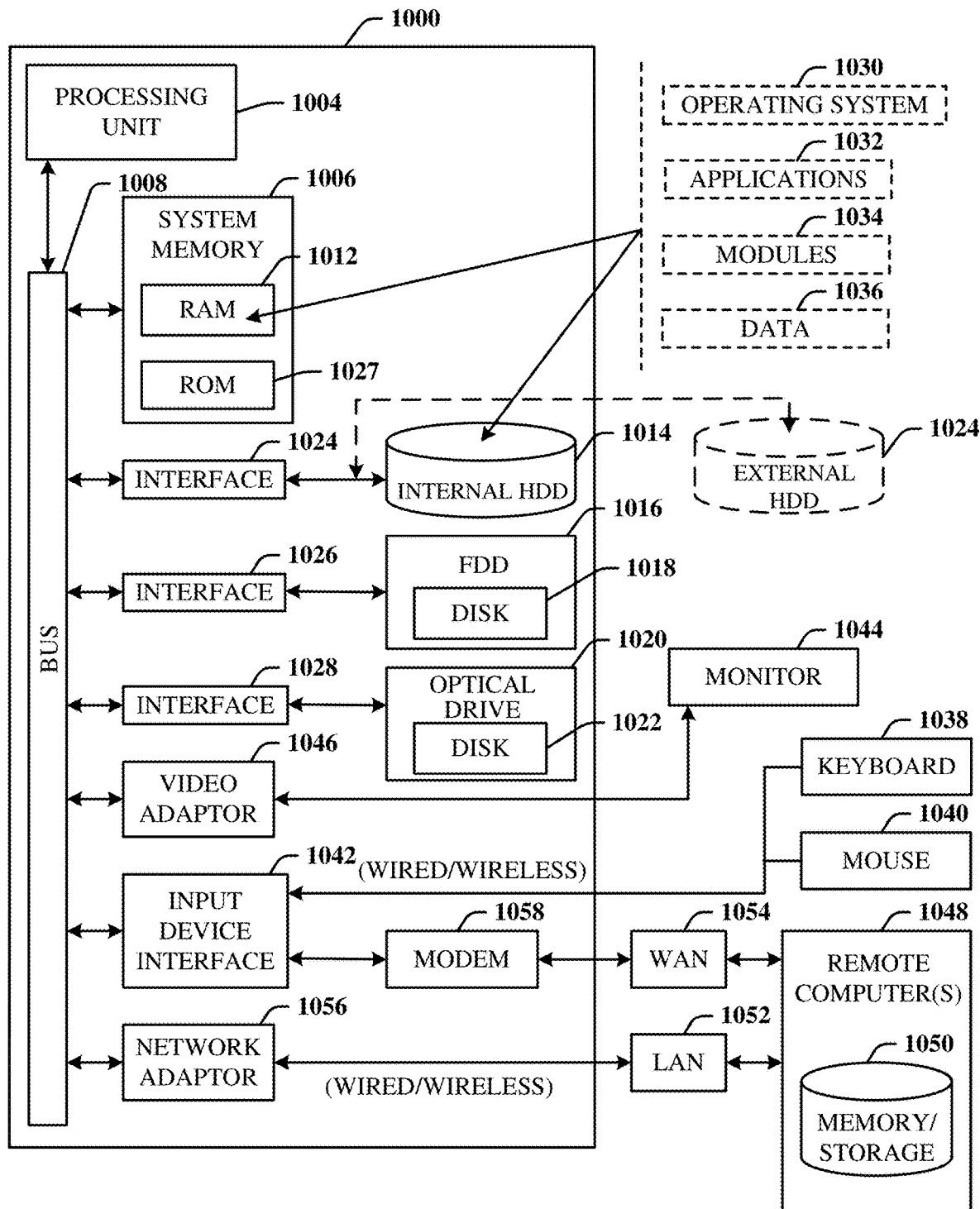
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
communicating first channel state information to a network device of a communication network, wherein the first channel state information is determined based on a received reference signal;
determining second channel state information based on a scheduled demodulation reference signal received from the network device and comprising determining a precoding matrix index, rank information, and channel quality index information, wherein the determining the second channel state information and decoding a physical downlink shared channel is performed at a same time; and
communicating the second channel state information to the network device.

2. The system of claim 1, wherein the decoding the physical downlink shared channel and the determining the second channel state information are performed in a same slot as determining a signal to interference plus noise ratio on an effective channel.

3. The system of claim 1, wherein the determining the second channel state information comprises estimating an effective channel, and wherein the operations further comprise using the effective channel as a new channel.

4. The system of claim 1, wherein the communicating the second channel state information comprises communicating the channel quality index information, the precoding matrix index, and the rank information to the network device.

5. The system of claim 4, wherein the operations further comprise:
determining a first rank of the rank information is less than or equal to a second rank of a physical downlink shared channel transmission.

6. The system of claim 1, wherein the determining the second channel state information comprises using mutual information to determine a link quality metric.

7. The system of claim 1, wherein the determining the second channel state information comprises using capacity information to determine a link quality metric.

8. The system of claim 1, wherein the communicating the second channel state information comprises communicating the second channel state information using a precoded channel.

9. The system of claim 8, wherein the precoded channel is configured to operate according to a fifth generation wireless network communication standard.

10. A method, comprising:
facilitating, by a mobile device of a communication network and to a network device of the communication network, a first transmission of first channel state information determined based on a received reference signal, the mobile device comprising a processor;
determining, by the mobile device in temporal proximity with decoding a physical downlink shared channel, second channel state information based on a demodulation reference signal received from the network device; and
facilitating, by the mobile device, a second transmission of the second channel state information to the network device, wherein the second channel state information comprises channel quality index information.

11. The method of claim 10, wherein the facilitating the second transmission comprises facilitating the second transmission to the network device using a precoded channel.

12. The method of claim 10, wherein the determining the second channel state information comprises determining the second channel state information during a physical downlink shared channel decoding time.

13. The method of claim 10, further comprising:
decoding, by the mobile device, the physical downlink shared channel; and
determining, by the mobile device, a signal to interference plus noise ratio on an effective channel during a same slot as the decoding the physical downlink shared channel and the determining the second channel state information.

14. The method of claim 10, wherein the determining the second channel state information comprises using mutual information to determine a link quality metric.

15. The method of claim 10, wherein the determining the second channel state information comprises using capacity information to determine a link quality metric.

16. The method of claim 10, wherein the determining the second channel state information comprises estimating an effective channel, and wherein the method further comprises using the effective channel as a new channel.

17. The method of claim 10, further comprising:
communicating the channel quality index information, a precoding matrix index, and rank information to the network device; and
determining a first rank of the rank information is less than or equal to a second rank of a physical downlink shared channel transmission.

18. A system, comprising:
a processor; and
a memory that stores executable instructions that, when executed by the processor, facilitate performance of operations, comprising:
receiving, from a mobile device, first channel state information for a first reference signal transmitted with a first precoding matrix;
determining a second precoding matrix based on a multiplication of previously used precoding matrixes including the first precoding matrix; and
transmitting, to the mobile device, a second reference signal with the second precoding matrix.

19. The system of claim 18, wherein the operations further comprise:
receiving, from the mobile device, second channel state information based on the second reference signal; and
determining a third precoding matrix as a function of the first precoding matrix and the second precoding matrix.

20. The system of claim 18, wherein the transmitting comprises transmitting the second reference signal using a channel configured to operate according to a fifth generation wireless network communication standard.

* * * * *